W. MANNING.
MACHINE FOR MAKING CORN CAKE.

No. 109,529.   Patented Nov. 22, 1870.

Witnesses: J. Henry Paige, Albert M. Moore

Inventor: William Manning

United States Patent Office.

WILLIAM MANNING, OF CHELMSFORD, MASSACHUSETTS.

Letters Patent No. 109,529, dated November 22, 1870.

IMPROVEMENT IN MACHINES FOR MAKING CORN CAKE.

*The Schedule referred to in these Letters Patent and making part of the same.*

I, WILLIAM MANNING, of Chelmsford, in the county of Middlesex and Commonwealth of Massachusetts, have invented certain new and useful Improvements in Machines for Making Corn Cakes, of which the following is a specification.

My invention relates to the combination of certain devices, hereinafter named, whereby corn cake is made of a very superior quality, of uniform thickness, and at much less expense than by the machines commonly employed.

Figures 1, 2:
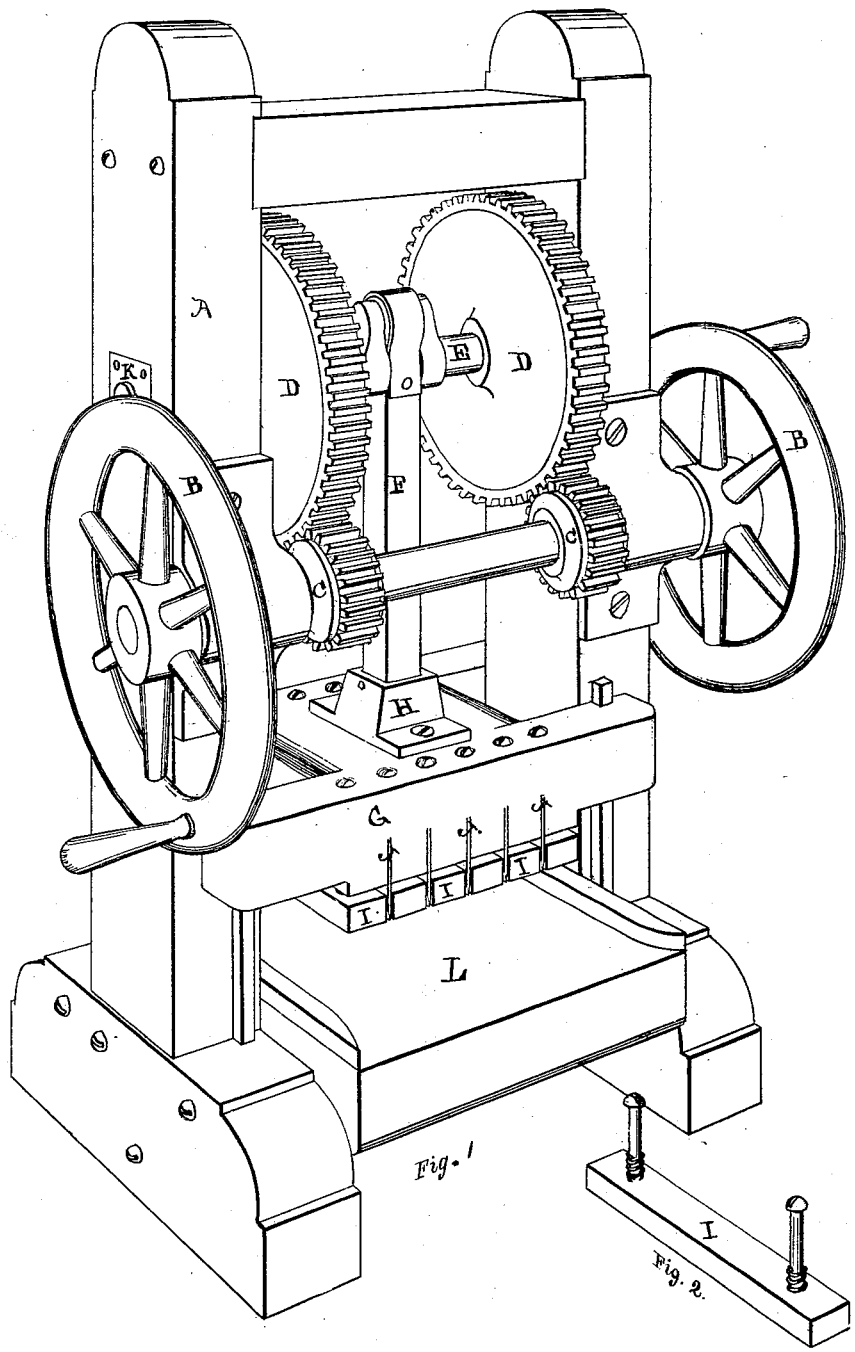
Figure 1 is a perspective view of my invention.
Figure 2 is a clearer disconnected from the follower.

A is the frame of the machine, which should be substantially constructed to resist the strain upon it, caused by the operating parts.

B B are two heavy balance-wheels, by which sufficient momentum is obtained to compress the cake as desired.

C C are two pinion gears on the balance wheel-shaft, working into two gears D D, on the crank-shaft.

E is the crank-shaft.

F, the connecting-rod, by means of which motion is communicated to the follower G.

H is a step which forms the connection between the connecting-rod and follower, said step is connected to said follower by means of screws or bolts, and when it is desirable to make a change in the thickness of the cake, the bolts are merely loosened, and one or more thicknesses of card-board are placed between said step and follower, or removed, as may be desired in making cake thicker or thinner.

I I I are the clearers, connected by screws or bolts to the follower, said follower has several recesses for the accommodation of the springs upon said screws; said springs and screws being shown in fig. 2. These springs operate upon the clearers for the purpose of releasing the knives from the cake after said cake has been compressed and indented.

J J J are the knives which are fastened to the follower, and are intended to indent the cake.

K is one of two boxes, disposed alike on both sides of the machine, and mortised into the frame a, for the accommodation of the crank-shaft E; said boxes are mortised into said frame for the purpose of being better adapted to withstand the severe strain upon the crank-shaft, than if they were attached otherwise to said frame.

L is a bed upon which the corn is placed when operated upon by said follower.

A table, as commonly constructed, is attached to the said bed, the upper surface of said table being on a level with the surface of the said bed.

A frame, as commonly in use, and described in Letters Patent granted me July 10, 1866, is placed upon the said table and filled with prepared corn, said corn is then placed upon said bed and operated upon by the follower, and compressed and indented and formed into squares.

In my said patent, issued July 10, 1866, the clearers were so constructed as to retire into recesses in the follower, when the compression was given to the prepared corn, thus affording but a slight and uneven pressure according to the tension of the springs attached to said clearers, (said clearers being intended merely to release the cake from the knives,) thus rendering it impossible to compress cake made of unground corn satisfactorily; but, by the improved construction of the clearers, as herein described, I can evenly compress the prepared corn, and secure a uniform indentation of the cake by the knives.

Another great advantage of my improved machine over that patented July 10, 1866, is, that the distance through which the follower travels by means of the crank, being always the same, enables the operator to easily adjust said follower by inserting or removing pieces of card-board, as heretofore described, so that corn cake of any desired thickness can be made.

This invention is not intended to interfere in the least with the machine for which Letters Patent were issued July 10, 1866, as results can be accomplised with this invention which it is impossible to accomplish with said machine patented July 10, 1866.

I claim as my invention—

The combination of the frame A, the balance-wheels B B, the gears C C, and shaft, the gears D D, the crank-shaft E, the connecting-rod F, the follower G, the step H, the clearers I I I with their operating springs, the knives J J J, the boxes K, and the bed L with the corn-cake frame, substantially as described and for the purpose specified.

WILLIAM MANNING.

Witnesses:
W. H. McDANIELS,
ALBERT M. MOORE.